United States Patent [19]

Hansen

[11] 4,128,275

[45] Dec. 5, 1978

[54] TIPPING VEHICLE

[75] Inventor: Otto A. H. Hansen, Germiston, South Africa

[73] Assignee: O.A.H. Homes (Proprietary) Ltd., South Africa

[21] Appl. No.: 829,961

[22] Filed: Sep. 1, 1977

Related U.S. Application Data

[63] Continuation of Ser. No. 700,857, Jun. 29, 1976, abandoned.

[30] Foreign Application Priority Data

Aug. 8, 1975 [ZA] South Africa .................. 75/5124

[51] Int. Cl.$^2$ .............................................. B60P 1/16
[52] U.S. Cl. ................................. 298/19 B; 298/22 P
[58] Field of Search ............... 298/22 R, 22 P, 19 B, 298/17.7

[56] References Cited

U.S. PATENT DOCUMENTS 2,449,202  9/1948  Day ................................. 298/19 B

FOREIGN PATENT DOCUMENTS 623956  7/1961  Canada ................................ 298/19 B
459776  9/1968  Switzerland ........................ 298/17.7
382285  10/1932  United Kingdom .................. 298/17.7

Primary Examiner—Albert J. Makay
Assistant Examiner—George F. Abraham

[57] ABSTRACT

A tipping vehicle comprising a chassis a body mounted on the chassis to tip about a tipping axis and a main and an auxiliary hydraulic ram for tipping the body, the rams each being connected independently of the other between the chassis and the body with the main ram being closer to the tipping axis than the auxiliary ram and with the rams having opposite inclinations with respect to the vertical when the body is in its lowered position.

8 Claims, 3 Drawing Figures

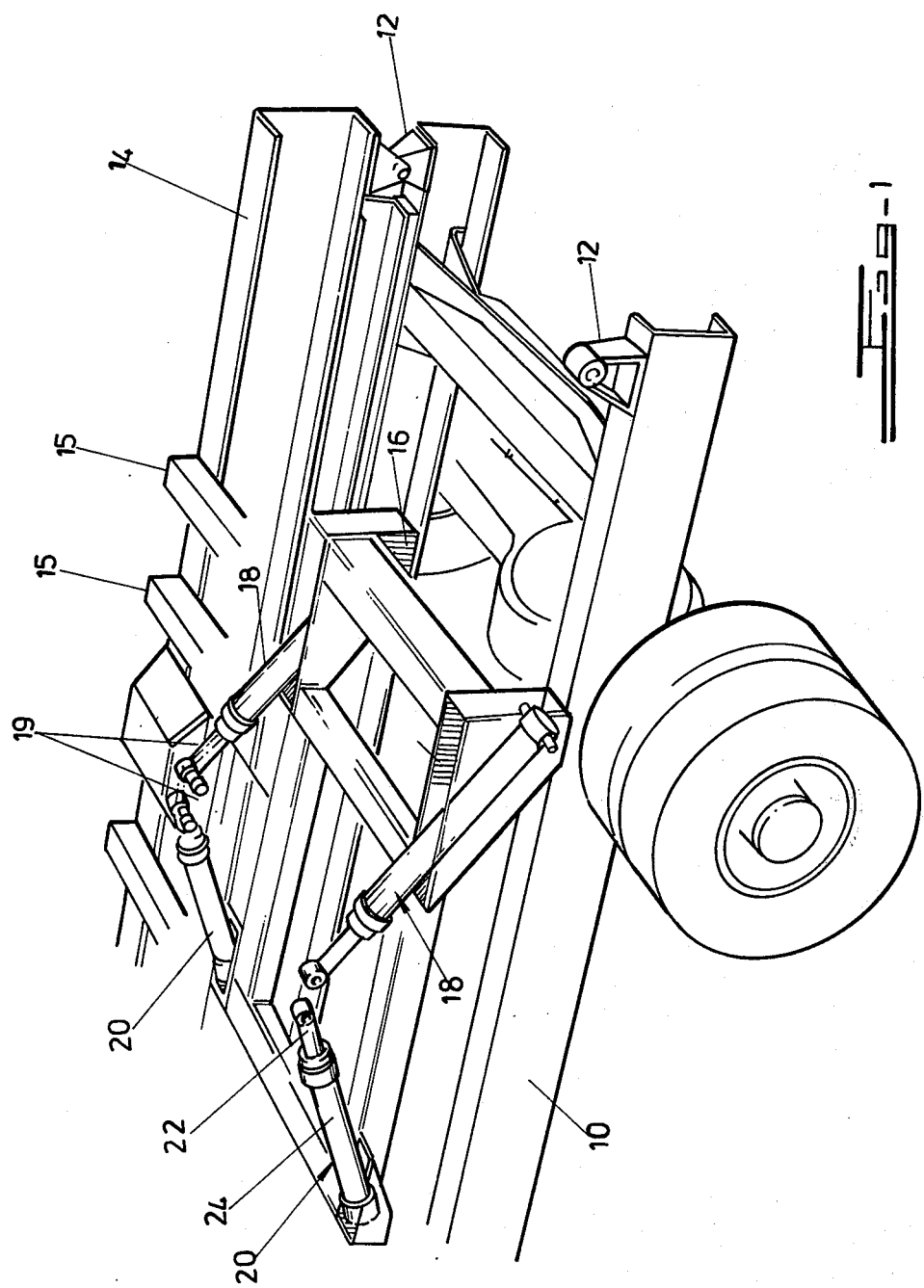

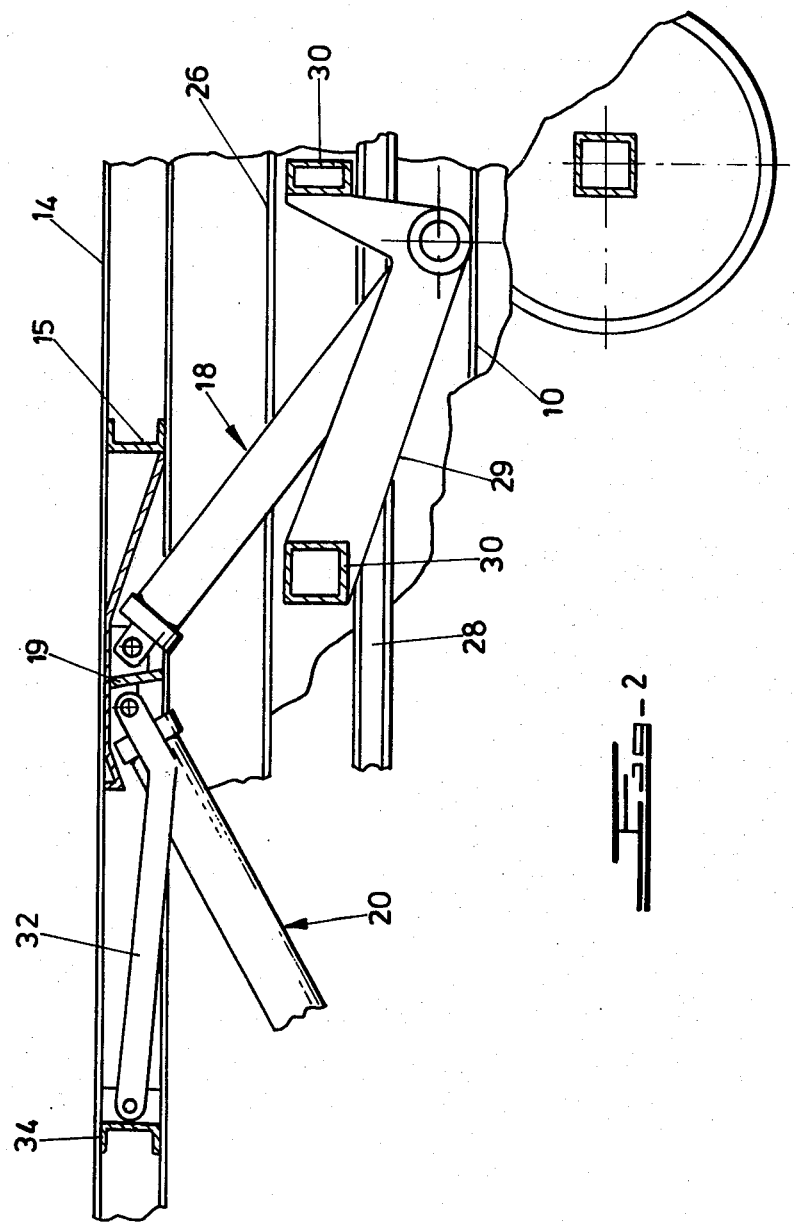

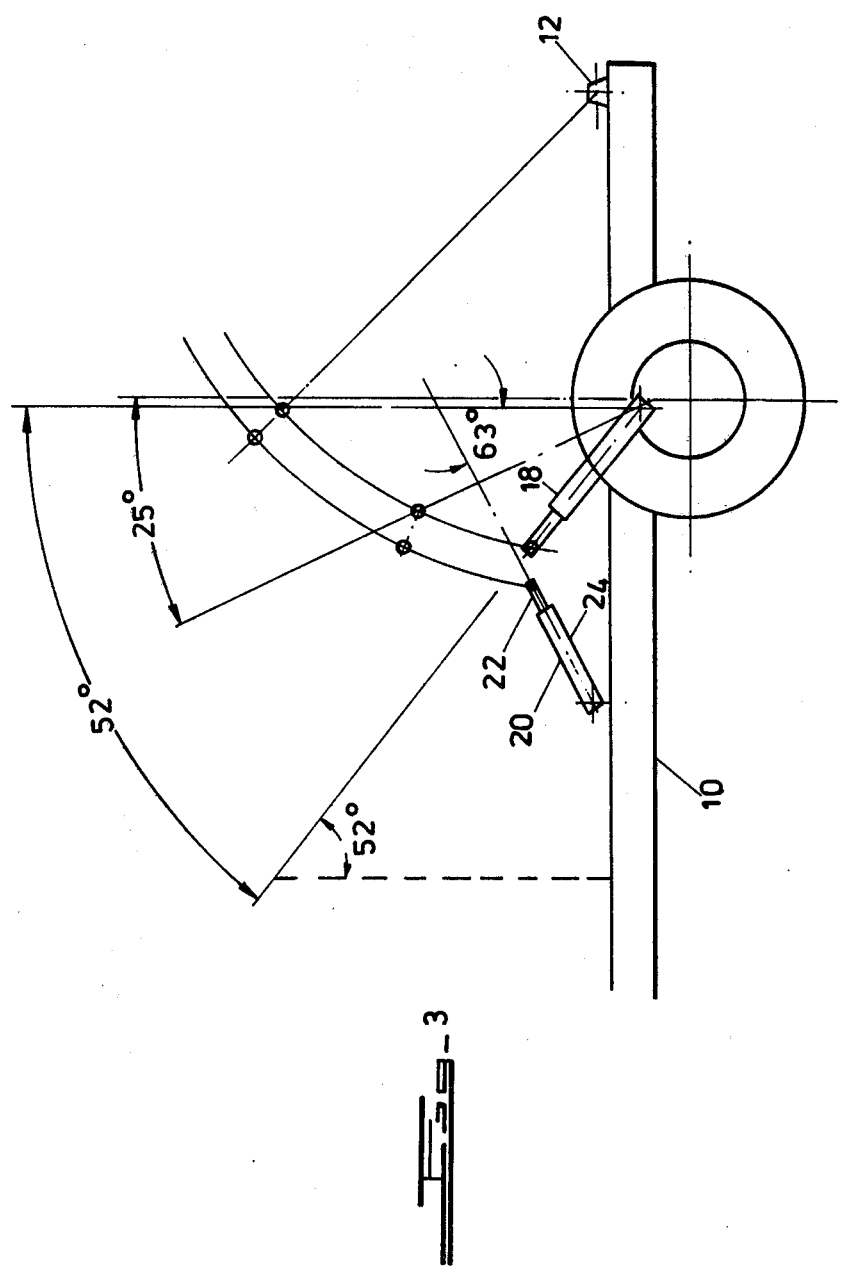

TIPPING VEHICLE

This is a continuation of application Ser. No. 700,857, filed June 29, 1976, now abandoned.

This invention relates to tipping vehicles, such as trucks, semi-trailers, special units and the like having a tipping body, which are used for transporting materials such as sand, bricks and the like and in particular to a mechanism for effecting tipping of the body to the rear of the vehicle.

In present practice the body is pivotally connected to the chassis of the vehicle along a horizontal transverse axis located towards the rear of the chassis. A hydraulic ram (or in some cases a series of rams) is connected directly, or by a compound lever system, between a point on the chassis and a point on the body to effect tipping when needed. Lever systems are sometimes used to ensure effective application of the thrust of the ram or to amplify the elongation or stroke of a short ram. It is necessary for the tipping mechanism to be as compact as possible. Very large forces are exerted in the ram and on its mountings during the first stages of tipping, when the direction of movement of the truck body is normally at a relatively large angle to the axis of the ram. For this reason a powerful ram must be used if the maximum load permitted by road traffic legislation is carried by the truck, and extremely robust supports must be provided for these forces in any stress-bearing members and, if they are employed, in the linkages of the lever system and in their mountings on the truck chassis.

A cylinder of a diameter of 15 to 20 cm. for the ram is generally used. With a cylinder of this size the extended length of the ram is substantially less than the extended length of a ram with a cylinder of smaller diameter and the same retracted length as the large ram.

An object of the invention is to provide a tipping mechanism which alleviates the above-described problem, and in particular which allows the use of cylinders of relatively small diameter, which are substantially cheaper than and impose considerably lower stresses than large cylinders.

According to the invention there is provided a tipping vehicle comprising a chassis; a body mounted on the chassis for tipping movement between a lowered position and a raised position; about a tipping axis that is transverse to a longitudinal axis of the vehicle and located towards the rear of the vehicle and a main and an auxiliary extensible ram for tipping the body, the rams each being connected independently of the other between a point on the chassis and a point on the body with the connection point for the main ram to the chassis being closer to the tipping axis than is the connection point for the auxiliary ram to the chassis and the rams having opposite directions of slope with respect to the vertical when the body is in its lowered position, such directions being upwardly convergent, the points at which the rams exert force on the chassis during a first stage of tipping the body from its lowered position being spaced further apart than are the points at which the rams exert force on the body during the same stage.

In a preferred form the body has an intermediate position between its lowered and raised positions and the main and the auxiliary rams are arranged to apply force together during an initial stage to tilt the body between its lowered and intermediate positions and further arranged so that only the main ram tilts the body between its intermediate and raised positions. Preferably means is provided for lost motion between the auxiliary ram and the chassis and tipping body during the remaining part of the path of the body.

With this arrangement the combined forces of the main and auxiliary rams are brought into play in the initial stage of tipping. After completion of the first part the auxiliary ram ceases to apply force, but by then the main ram is partially extended and the angle between its direction of application of force and the vertical is substantially reduced, so that it is well poised to apply the full force necessary in the remaining part of the tipping movement. Preferably at least two main rams are used so as to spread the load over two longitudinal chassis members.

In the drawings:

FIG. 1 is a perspective view of a part of a tipping truck incorporating the mechanism of the invention, some parts being omitted for the sake of clarity;

FIG. 2 is a side view of part of a variant of the tipping truck of FIG. 1 showing the connection of the main and auxiliary rams to the body; and FIG. 3 is a semi-schematic side view of certain parts of the truck of FIG. 1.

In FIG. 1, an end tipping truck has a conventional wheeled chassis 10 having towards its rear end brackets 12 for pivotal attachment of a tipping body of which only a frame beam 14 and a few other particulars such as cross-members 15 are shown.

Mounted in box-type housings 16 in the truck chassis 10 is a pair of main hydraulic rams 18 each pivoted at its lower end to a fixed mounting and at its other end to an attachment plate 19 (one only of them is shown) which is firmly connected to the tipping body. The rams are conventional and comprise a piston movable within a cylinder. Forwardly of the main rams is a pair of auxiliary rams 20 each connected between a lower attachment point on the truck chassis 10 and an upper attachment point which is again the plate 19. If desired there can be further main and auxiliary rams, or even only one auxiliary ram. To ensure the most economical use of the maximum limits laid down by current road traffic legislation there will normally be four rams. The main rams are attached to the chassis at points adjacent the axle nearest the tipping axis or to the wheel suspension points closest to the tipping axis. The main rams are of a conventional type having a single piston and rod in the cylinder body, and can be of considerably lesser diameter than is usual. For instance, they may have 63 mm diameter cylinders. The auxiliary rams, in FIG. 1, are modified to the extent that there is provision for lost motion between the rod 22 of the piston and the cylinder body 24 once the cylinder has reached its normal maximum extended length, so that further extension is possible but not under power. For instance the rod 22 may be telescopic in another rod (not seen) which is in fact the standard tubular rod for certain types of hydraulic rams. Note that the axis of each ram 18 or 20 lies in a fore-and-aft plane, that is a plane to which the tipping axis is normal. Further, the drawings make it clear that the points at which the main and auxiliary rams exert force on the chassis during the first stage of tipping the body from its lowered position are spaced further apart than are the points at which the rams exert force on the body during the same stage. The drawings also show that at no stage do the main rams and the auxiliary rams, when viewed in side elevation (as in FIG. 3), cross each other.

In FIG. 2 parts similar to those in FIG. 1 are identified with the same numbers used in FIG. 1. A sub-frame 26 is mounted on the chassis 10 by means of a hardwood beam 28 in the conventional manner. The main rams 18 each have their cylinders pivotally mounted in channel-section flanges 29 that are secured to cross-beams 30 extending between the sub-frames 26. The other ends of the main rams are pivotally connected to the attachment plate 19 on the tipping body.

The auxiliary ram 20, which is not completely shown in FIG. 2, is pivotally connected to cross-members on the sub-frame 26 at one end and at the other end carries a linkage 32 that is pivotally connected to the ram and to a flange on a tipping body cross-member 34. The auxiliary ram at its end remote from the chassis is adapted to seat in a recess bounded by the attachment plate 19 and the frame member 14.

In practice with this embodiment the auxiliary ram extends under power for an initial part of the tilting of the body; during this part the ram is engaged in the recess. When the auxiliary ram has reached its limit, the main ram continues to tilt the body and the auxiliary ram disengages from the recess and does not help to tilt the body. The auxiliary ram, however, remains connected to the body through the linkage 32 so that when the body descends from its raised position, the auxiliary ram is properly located to engage in the recess.

The arrangement for the auxiliary ram described above with reference to FIG. 2 can be inverted so that the ram at one end is pivoted on the attachment plate 19 and at its other end carries the linkage 32 which is pivoted to the chassis. Furthermore the auxiliary ram can be pivotally connected at each end by a linkage 32, i.e. to the body and the chassis.

FIG. 3 shows the basic geometry of one suitable arrangement of the invention. In this arrangement the axis of the main rams 18 is preferably inclined at 52° to the vertical when tipping starts and when the forces in the rams is at a maximum. The auxiliary rams 20 are located at a somewhat greater angle to the vertical, preferably about 63°. The directions of slope of the main and auxiliary rams tend to converge upwardly. In a first stage of tipping both main and auxiliary rams apply force through a common source of pressure liquid (not shown) and tipping proceeds until the angle between the main rams 18 and the vertical is reduced to about 25°. At this stage the auxiliary rams 20 are fully extended and for the remaining part of the tipping operation the rods 22 merely telescope outwards, as in FIG. 1, or disengage from the recess, as in FIG. 2, to provide lost motion. The rams 18 carry the full load in the second stage of tipping, which ends when the rams 18 are fully extended and stand substantially vertical.

The sequence of operations reverses when the body of the truck is retracted back to its lowered position on the chassis.

The rams 18 and 20 are located fully underfloor of the truck body and also do not project below the chassis, yet they are able to tilt the body when it is fully loaded. The same cannot be said of conventional tipping mechanisims unless they are provided with complicated compound levers which are succeptible to breakdown.

For all the embodiments discussed above the main ram 18 is directly connected between a pivot on the chassis and a pivot on the body. In other embodiments the main rams can be indirectly connected at either end, e.g. through one or more linkages, if this is desirable or when fitting of the rams into a particular body and chassis configuration makes it necessary.

An important feature of this invention is that the main rams are connected to the chassis at points adjacent the wheel suspension mounting points on the chassis. In the event of a chassis having a single wheel-axle adjacent the tipping axis, then the connection points are positioned approximately above the wheel-axle. If the vehicle has a double-axle configuration, then the connection points are positioned on the chassis to be approximately above the mid-point between the two axles. This configuration ensures that any bending moments applied to the chassis by the main rams are minimal. Thus, for carrying the same load as a vehicle having a conventional tipping mechanism the chassis is better protected against the danger of bending than is the chassis of a vehicle having the conventional tipping mechanism. Similarly, the provision of an auxiliary ram to assist the main ram at the start of tipping ensures that any loads applied to the chassis are well distributed over it, and this factor enhances the protection of the chassis against bending forces.

The chassis of a vehicle fitted with the tipping mechanism of the invention will have a longer life than a vehicle fitted with a conventional tipping mechanism because any load applied to the chassis is well distributed over its length and bending moments imposed on the chassis are minimised.

In a similar vein, it can be seen that, because of the lighter chassis construction which can be used with the tipping mechanism of the invention, for a given maximum permissible load, a vehicle fitted with the mechanism of the invention can carry a higher payload than a vehicle fitted with a conventional tipping mechanism.

I claim:

1. A tipping vehicle comprising a chassis; a body mounted on the chassis for tipping movement between a lowered position and a raised position about a tipping axis that is located towards the rear of the vehicle and is transverse to a longitudinal axis of the vehicle, and a main and an auxiliary extensible ram for tipping the body, the rams each being connected independently of the other between a point on the body and a point on the chassis with the connection point for the main ram to the chassis being closer to the tipping axis than is the connection point for the auxiliary ram to the chassis, and with the rams having opposite directions of slope with respect to the vertical when the body is in its lowered position, such directions being upwardly convergent and the included angle between such directions (viewed in side elevation of the vehicle) in such lowered position being greater than 90°, the points at which the rams exert force on the chassis during a first stage of tipping the body from its lowered position being spaced further apart than are the points at which the rams exert force on the body during the same stage, the body having an intermediate position between its lowered and raised positions and the main and auxiliary rams being arranged to apply force together during an initial stage to tilt the body between its lowered and intermediate positions and further arranged so that only the main ram tilts the body between its intermediate and raised positions, means being provided to accommodate lost motion between the auxiliary ram and the body as the body is tilted between its intermediate and raised positions, both the main and the auxiliary rams being conventional piston-and-cylinder combinations each having in its cylinder a single piston and rod.

2. A tipping vehicle as claimed in claim 1, in which the main and auxiliary rams, when viewed in side elevation of the vehicle, do not cross each other at any stage during tipping.

3. A tipping vehicle as claimed in claim 1, in which the axis of each ram is located in a plane to which the tipping axis is substantially normal.

4. A tipping vehicle as claimed in claim 1, in which the chassis has, towards its end nearest the tipping axis, a wheel suspension mounting point and the main ram is connected to the chassis at a point adjacent the suspension mounting point.

5. A tipping vehicle as claimed in claim 1, in which the connection points for the main ram to the chassis and to the body are such that the main ram is at most vertical when the body is in its raised position.

6. A tipping vehicle as claimed in claim 1, in which the chassis has longitudinal members and the connection point for the auxiliary ram to the chassis is above the longitudinal members.

7. A tipping vehicle as claimed in claim 1, in which the connection point for the auxiliary ram to the chassis is above the connection point for the main ram to the chassis.

8. A tipping vehicle as claimed in claim 1, in which the chassis has longitudinal members and the connection point for the main ram to the chassis is not below such longitudinal members.

* * * * *